(12) United States Patent
Bertrand

(10) Patent No.: US 9,254,714 B2
(45) Date of Patent: Feb. 9, 2016

(54) TREADED WHEEL

(71) Applicant: ROLL-TECH MOLDING PRODUCTS, LLC, Hickory, NC (US)

(72) Inventor: Patrice Bertrand, Hickory, NC (US)

(*) Notice: Subject to any disclaimer, the term of this patent is extended or adjusted under 35 U.S.C. 154(b) by 403 days.

(21) Appl. No.: 13/777,180

(22) Filed: Feb. 26, 2013

(65) Prior Publication Data
US 2014/0239705 A1    Aug. 28, 2014

(51) Int. Cl.
| B60B 37/06 | (2006.01) |
| B60B 5/02 | (2006.01) |
| B60B 1/06 | (2006.01) |
| B60B 1/00 | (2006.01) |

(52) U.S. Cl.
CPC . *B60B 37/06* (2013.01); *B60B 1/06* (2013.01); *B60B 5/02* (2013.01); *B60B 1/006* (2013.01); *B60B 2310/204* (2013.01); *B60B 2310/321* (2013.01); *B60B 2360/32* (2013.01); *B60B 2360/50* (2013.01); *B60B 2900/211* (2013.01)

(58) Field of Classification Search
CPC .................................. B60B 5/02; B60B 37/06
See application file for complete search history.

(56) References Cited

U.S. PATENT DOCUMENTS

| 3,888,545 | A | | 6/1975 | Braun | |
| 3,907,370 | A | * | 9/1975 | Bard | B60C 7/00 |
| | | | | | 301/39.1 |
| 4,444,435 | A | * | 4/1984 | Honsa | B65F 1/1473 |
| | | | | | 301/64.701 |
| 4,511,184 | A | | 4/1985 | Schauf et al. | |
| 4,857,122 | A | | 8/1989 | Majerus | |
| 5,316,377 | A | | 5/1994 | Markling et al. | |
| 5,833,324 | A | | 11/1998 | Conradsson | |
| 7,481,498 | B1 | | 1/2009 | Morris | |
| 8,037,911 | B2 | | 10/2011 | Morris | |
| 2010/0253133 | A1 | | 10/2010 | Rota | |
| 2012/0019052 | A1 | | 1/2012 | Morris | |

* cited by examiner

*Primary Examiner* — James Sanders
(74) *Attorney, Agent, or Firm* — Blake E. Vande Guarde

(57) ABSTRACT

A wheel comprising: an inner hub including a first side, a second side being generally parallel to and opposite of the first side, an axle shaft emanating up from the second side, a plurality of inner spokes emanating up from the second side and outward from the axle shaft and engaging an inner circumferential member; an outer hub engaged to the inner circumferential member, a plurality of outer spokes emanating from the inner circumferential member, the outer spokes being engaged to the inner circumferential member at a proximal end of the spokes and engaged to an inner surface of an over mold substrate at a distal end of the spokes, the over mold substrate also having an outer surface being generally parallel to and opposite of the inner surface; and a over mold tread chemically bonded to the outer surface of the over mold substrate.

6 Claims, 13 Drawing Sheets

TREADED WHEEL

FIELD OF THE INVENTION

The present invention relates to wheels, and more specifically, to wheels having a tread.

BACKGROUND OF THE INVENTION

The use of plastic wheels on a wide variety of products is known. Among these products, are various forms of push and pull carts having two or more wheels. These carts may include beach carts, hand carts, refuse carts, baggage carts, golf push carts and the like. The use of plastic wheels on these types of carts has proven to be both reliable and economical. Additionally, there is a long standing need to develop recycling methods which enable the processing of old materials into new products in order to both preserve limited natural resources and prevent the waste of potentially useful materials. When compared to virgin production, recycling also allows manufacturers to reduce energy usage, reduce air pollution, reduce water pollution, reduce the need for "conventional" waste disposal (i.e. a landfill), and lower greenhouse gas production. Some materials are easily recyclable such as glass, metal and paper. Other materials, such as plastic, textiles and electronics, are more difficult to recycle. In the past, much of these waste products from the manufacture of products or post consumer used materials which incorporate plastics were simply shipped off to the landfill. Today, the desirability of so-called "green" manufacturing has increased remarkably. "Green" manufacturing include the incorporation of recycled materials into the finished product, as well as the ability to reclaim previously used materials as either a fresh supply of the material being produced or the reuse of the original material in the production of a different material.

Hence, a need exists for a durable, plastic wheel which makes use of recycled materials in its formation.

SUMMARY OF THE INVENTION

A wheel comprising: an inner hub including a first side, a second side being generally parallel to and opposite of the first side, an axle shaft emanating up from the second side, a plurality of inner spokes emanating up from the second side and outward from the axle shaft and engaging an inner circumferential member; an outer hub engaged to the inner circumferential member, the outer hub including a first side, a second side being generally parallel to and opposite of the first side, a plurality of outer spokes emanating from the inner circumferential member, the outer spokes being engaged to the inner circumferential member at a proximal end of the spokes and engaged to an inner surface of an over mold substrate at a distal end of the spokes, the over mold substrate also having an outer surface being generally parallel to and opposite of the inner surface; and a over mold tread chemically bonded to the outer surface of the over mold substrate, the over mold tread comprising a mixture of a rubber, a polymer and a recycled polymer.

DETAILED DESCRIPTION

Figure 1:
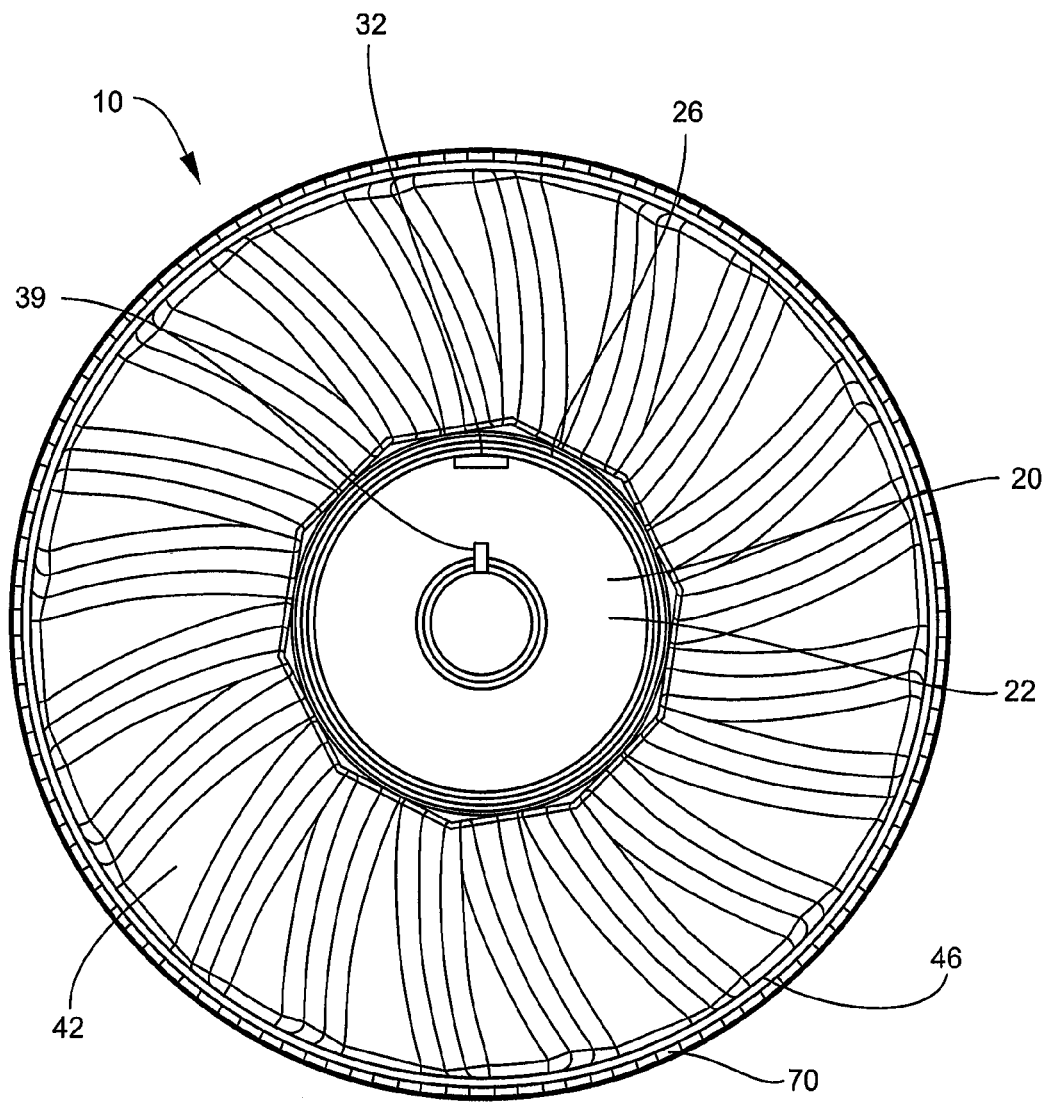
FIG. 1 is top view of the wheel.

Looking to FIGS. 1-6 we see that the present invention relates to a wheel 10 comprising: an inner hub 20 including a first side 22, a second side 24 being generally parallel to and opposite of the first side, an axle shaft 30 emanating up from the second side 24, a plurality of inner spokes 25 emanating up from the second side 24 and outward from the axle shaft 30 and engaging an inner circumferential member 26; an outer hub 40 engaged to the inner circumferential member 26, the outer hub 40 including a first side 42, a second side 44 being generally parallel to and opposite of the first side, a plurality of outer spokes 45 emanating from the inner circumferential member 26, the outer spokes 45 being engaged to the inner circumferential member 26 at a proximal end 52 of the spokes and engaged to an inner surface 47 of an over mold substrate 46 at a distal end 54 of the spokes 45, the over mold substrate 46 also having an outer surface 48 being generally parallel to and opposite of the inner surface; and a over mold tread 70 chemically bonded to the outer surface 48 of the over mold substrate 46, the over mold tread 70 comprising a mixture of a rubber, a polymer and a recycled polymer.

Figure 2:
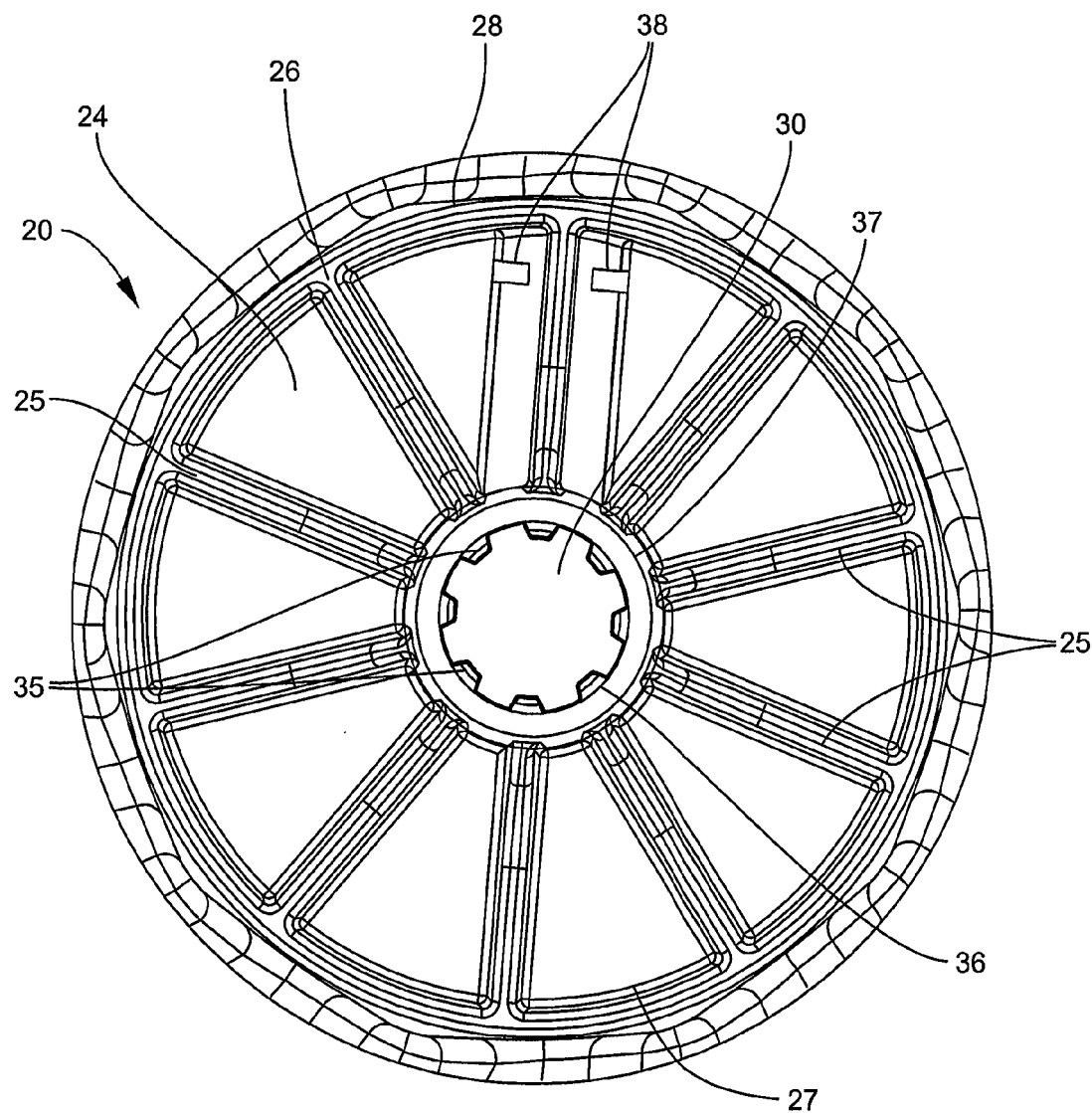
FIG. 2 is a bottom view of the inner hub.
Figure 3:
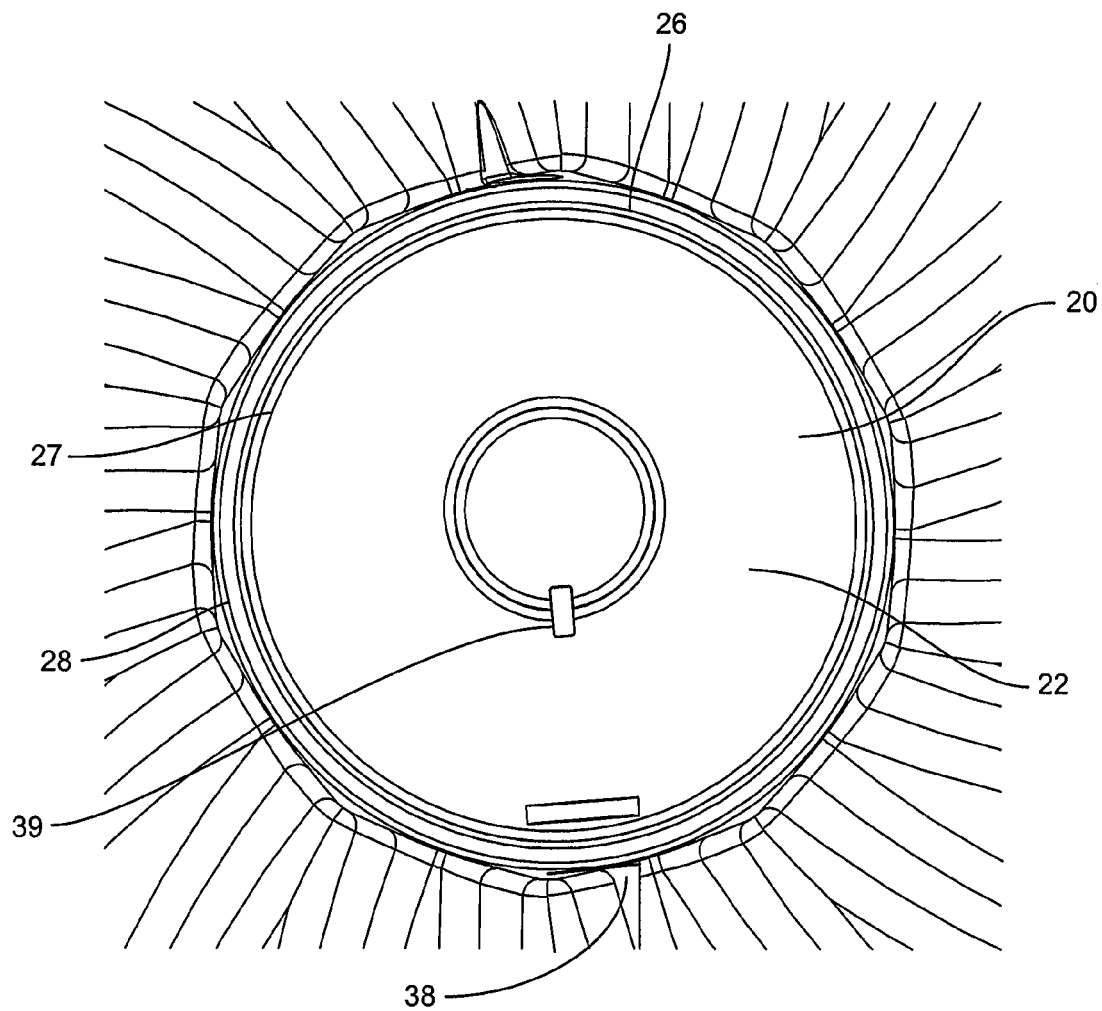
FIG. 3 is a top view of the inner hub.
Figure 4:
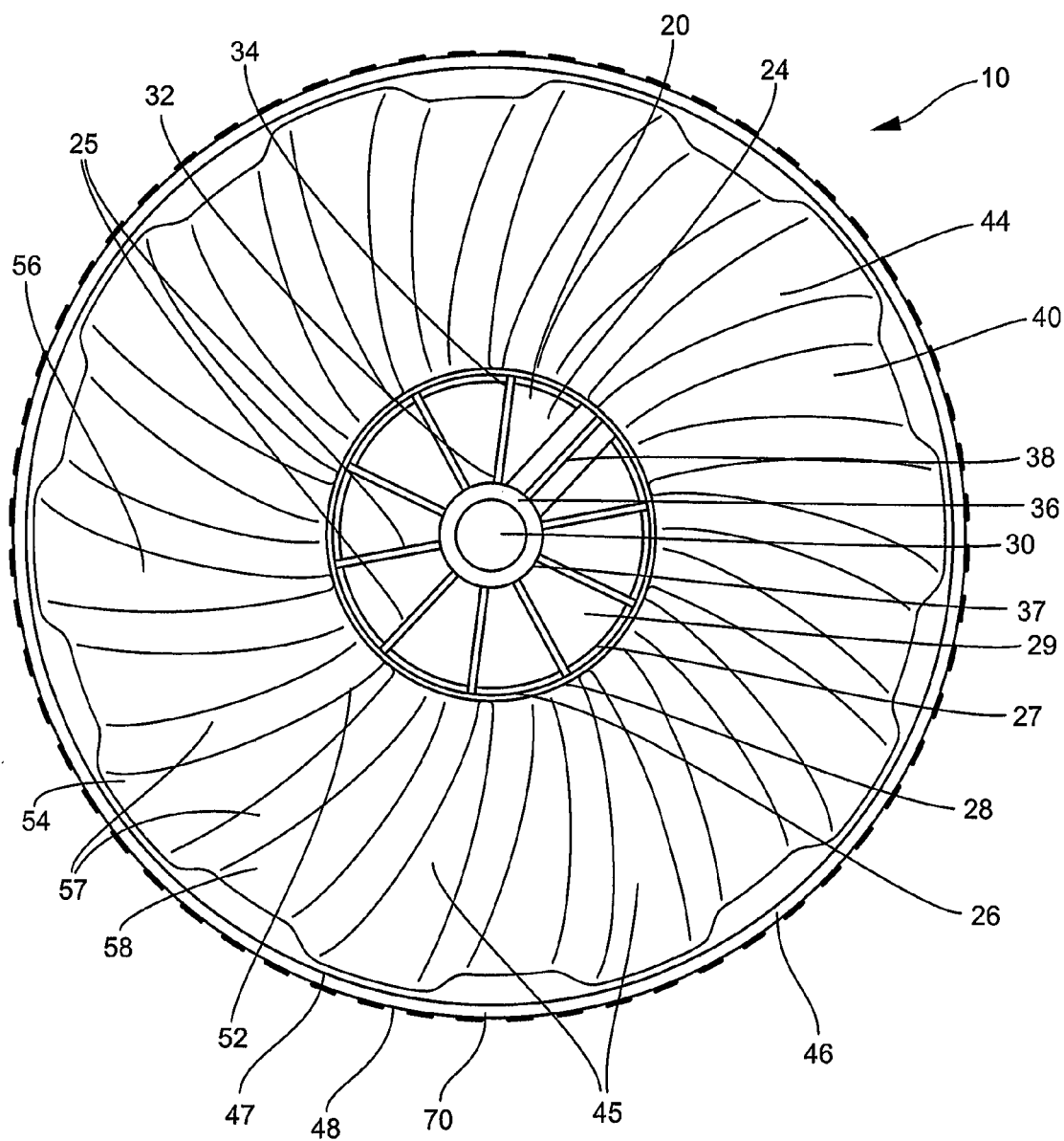
FIG. 4 is a bottom view of the wheel.
Figure 5:
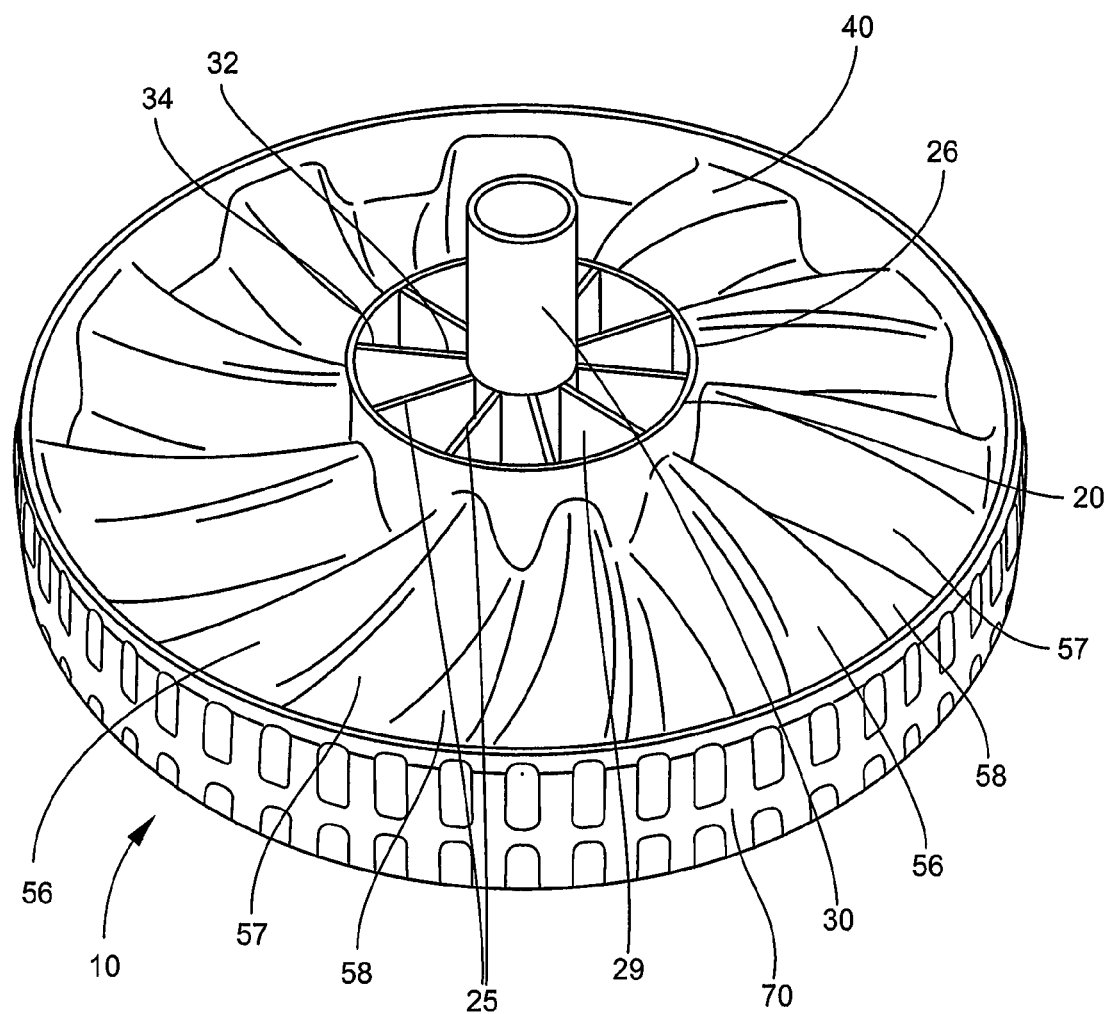
FIG. 5 is a profile view of the wheel.
Figure 6:
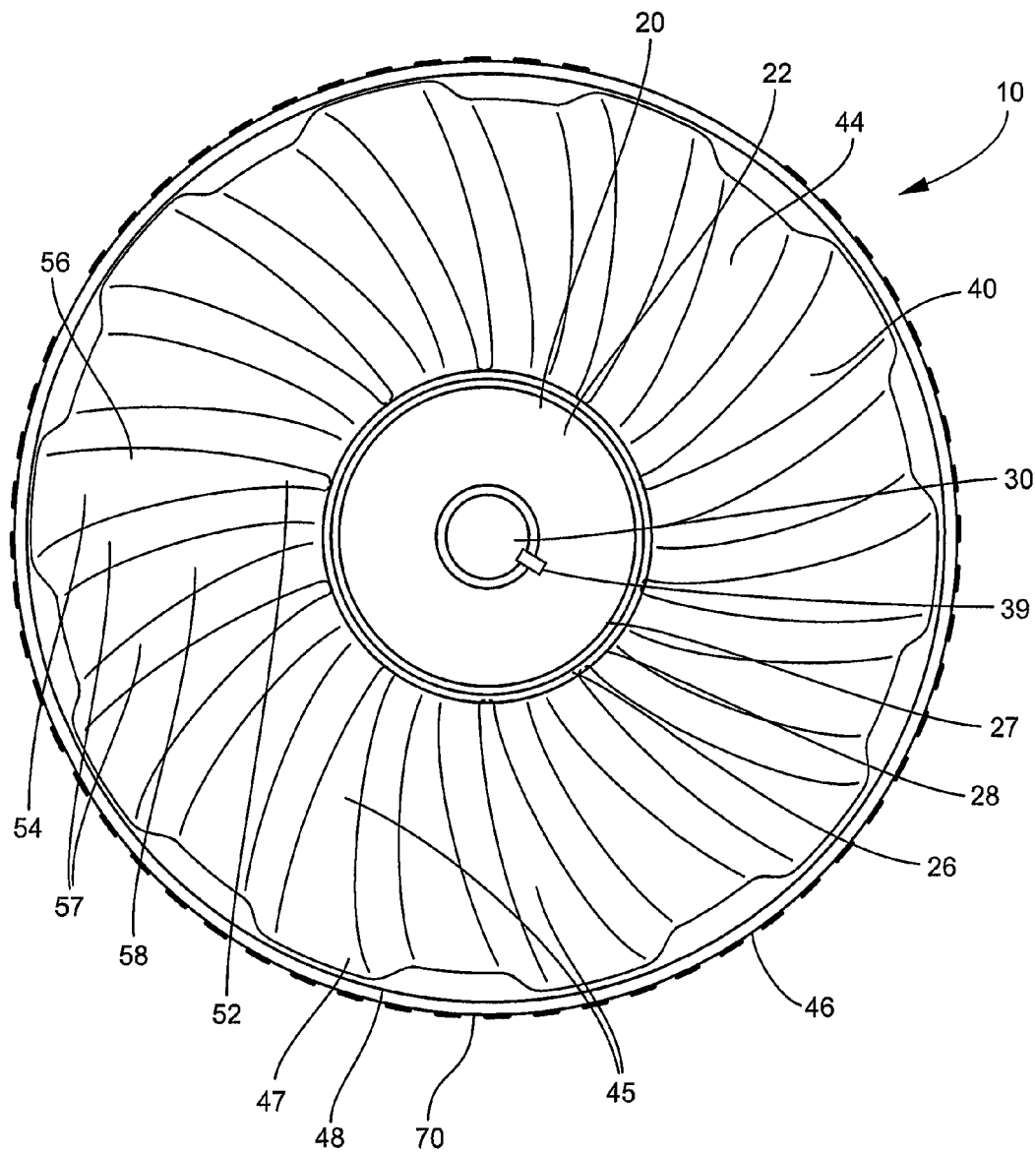
FIG. 6 is a top view of the wheel.
Figure 7:
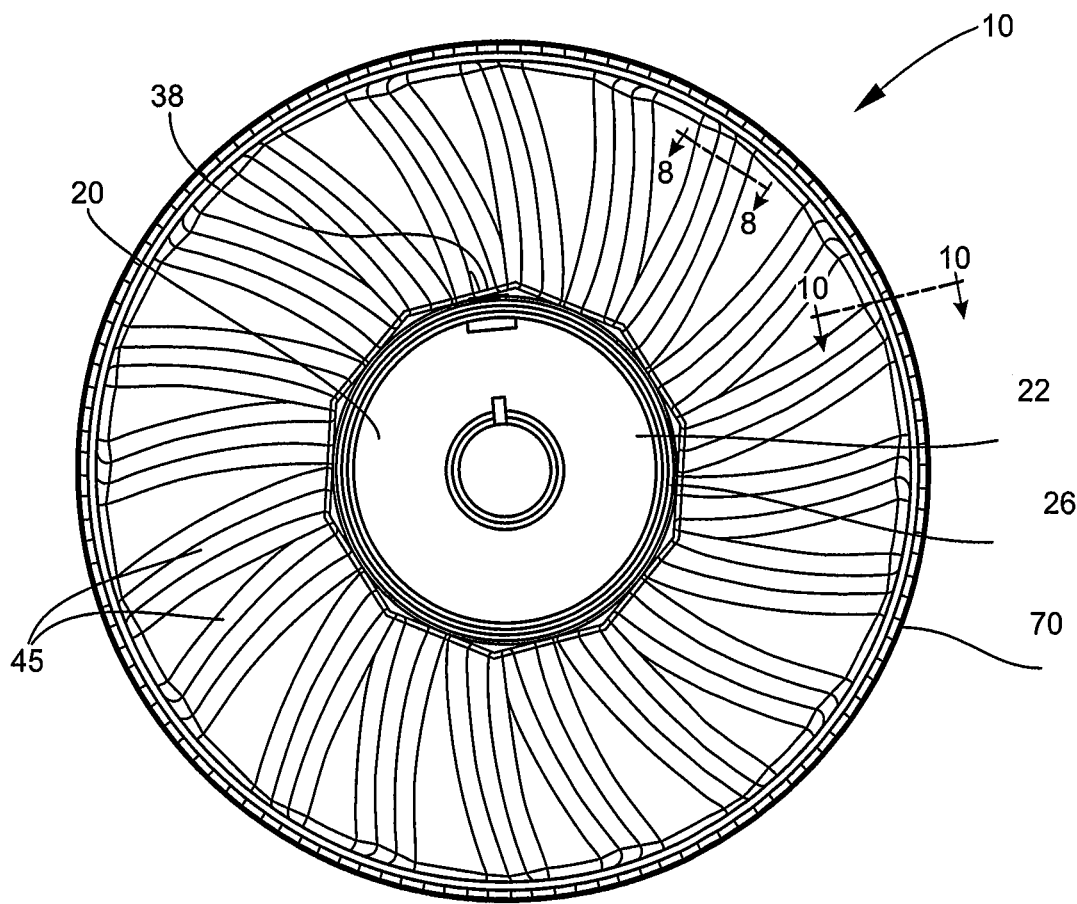
FIG. 7 is a top view of the wheel.
Figure 12:
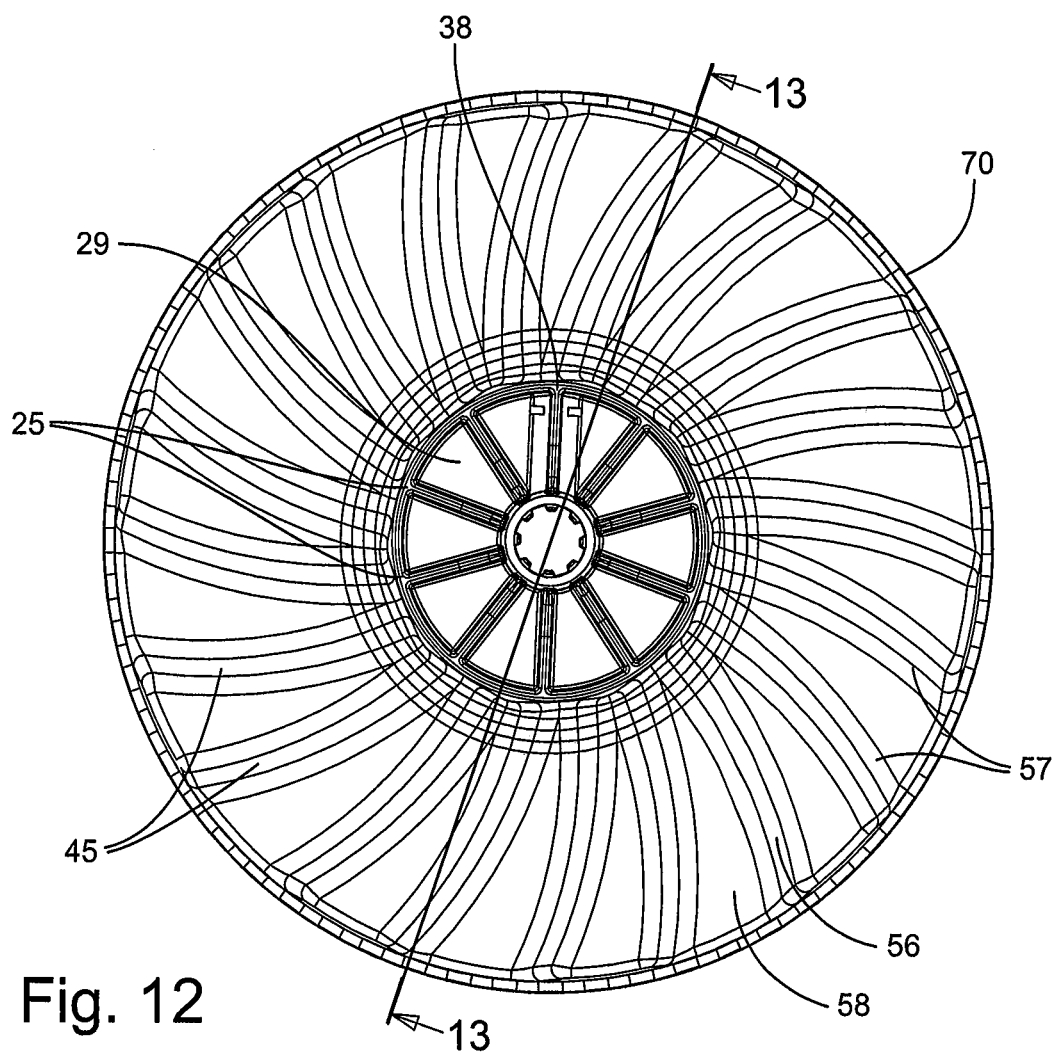
FIG. 12 is a bottom view of the wheel.
Figure 13:
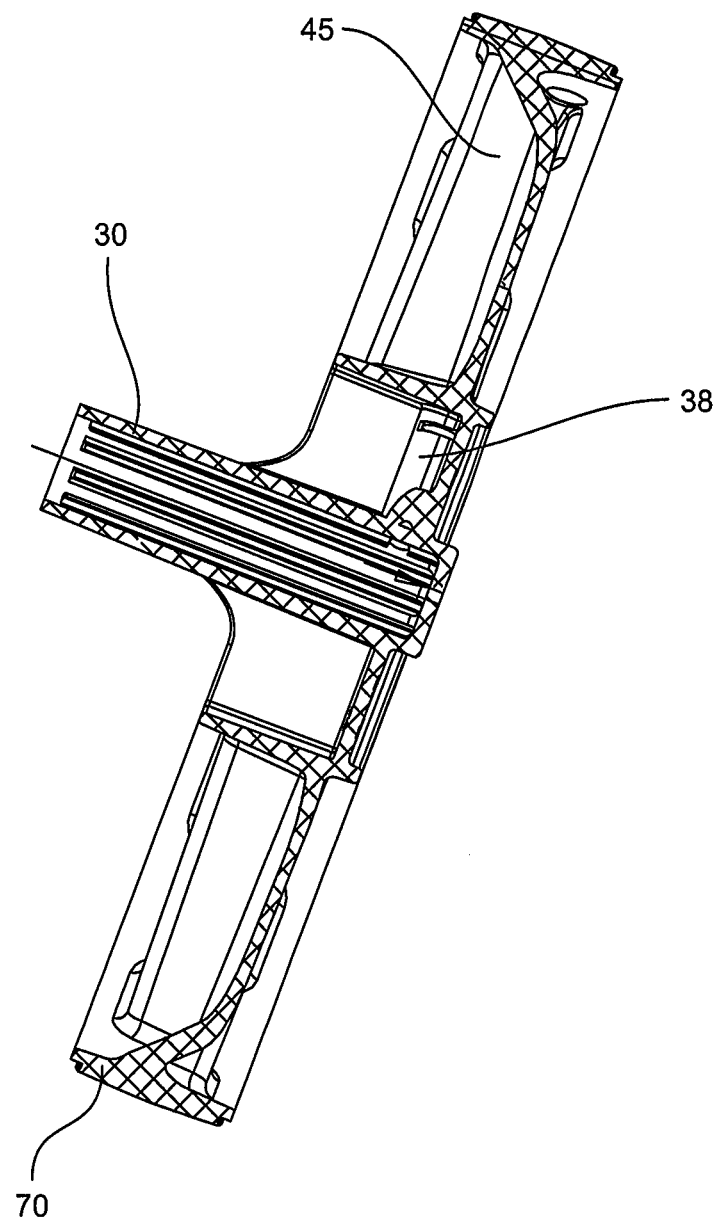
FIG. 13 is a cut through of 14-14 from FIG. 13.
Figure 14A:
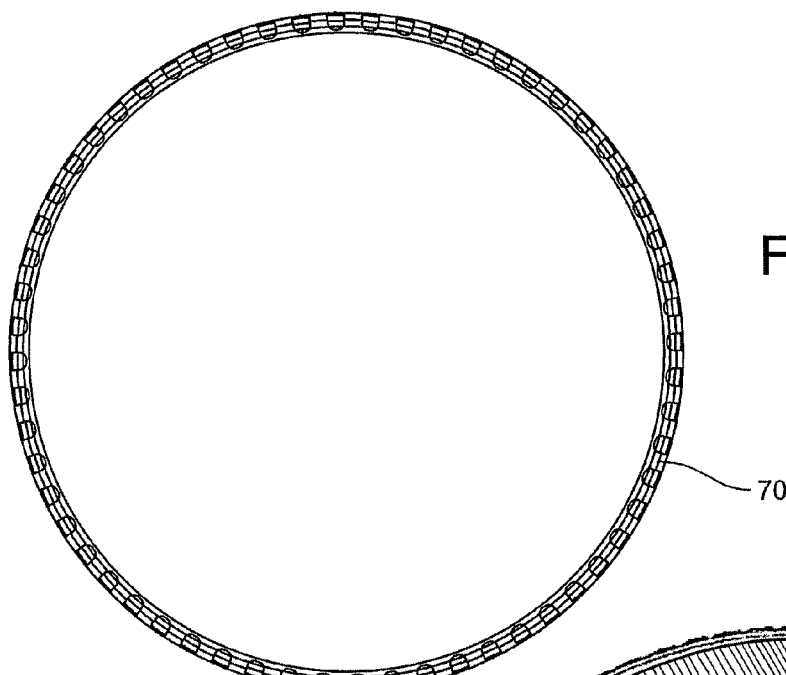
FIG. 14A is a top view of the over mold tread.
Figure 14B:
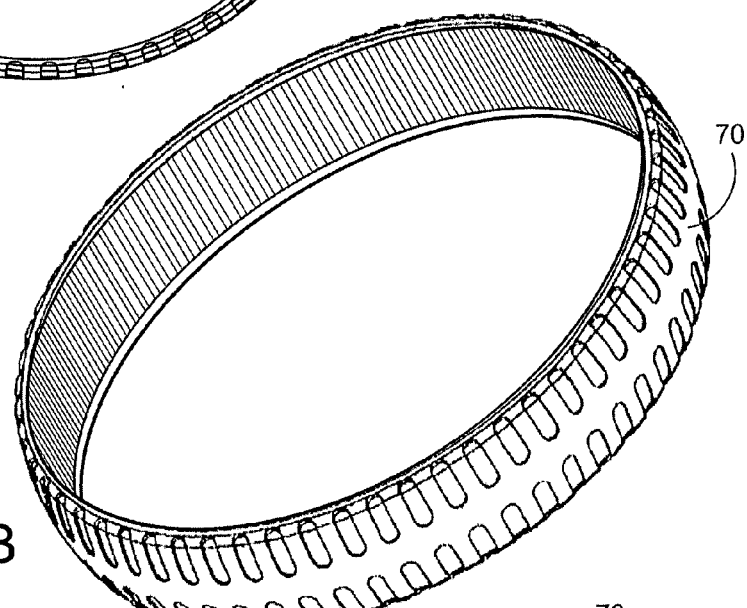
FIG. 14B is a profile view of the over mold tread.
Figure 14C:
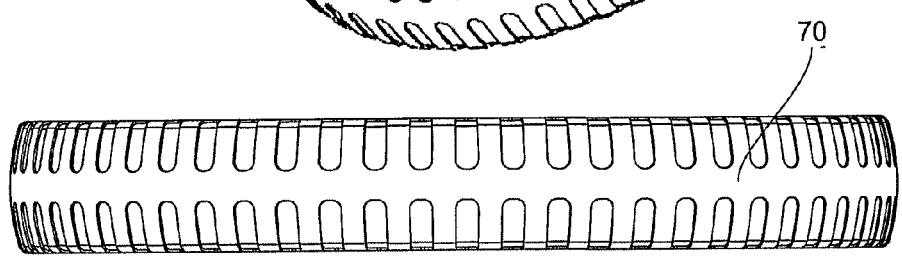
FIG. 14C is a side view of the over mold tread.
Figure 15A:
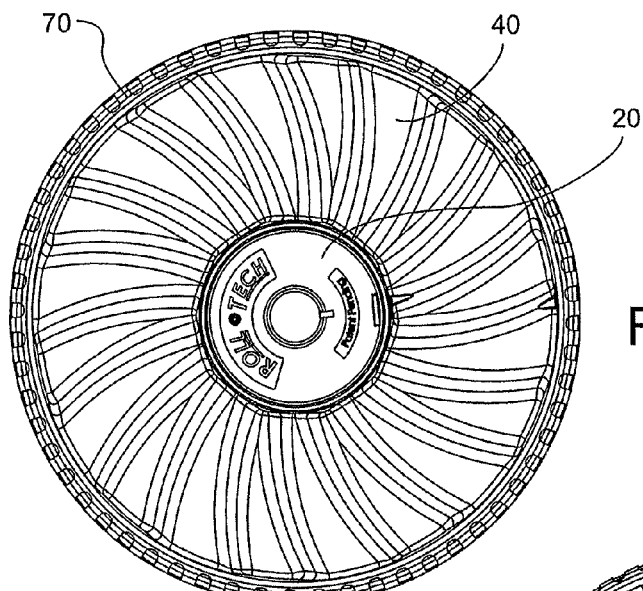
FIG. 15A is a top view of the tire.
Figure 15B:
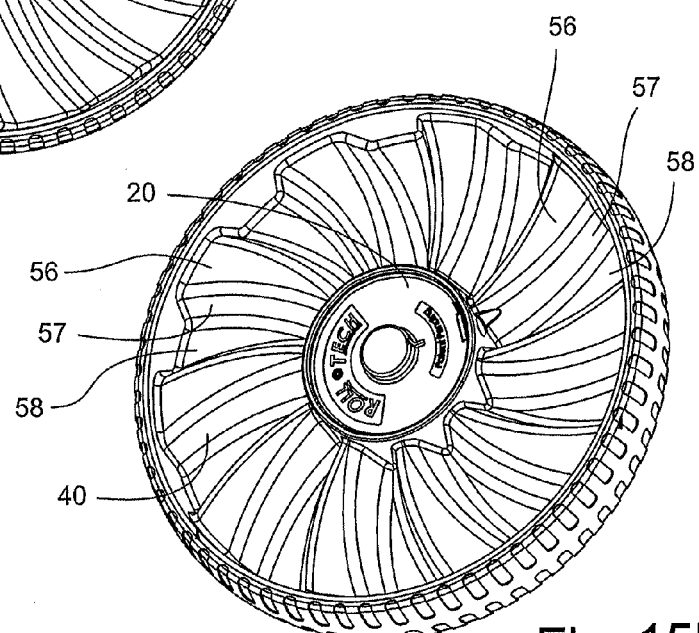
FIG. 15B is a profile view of the tire.
Figure 15C:
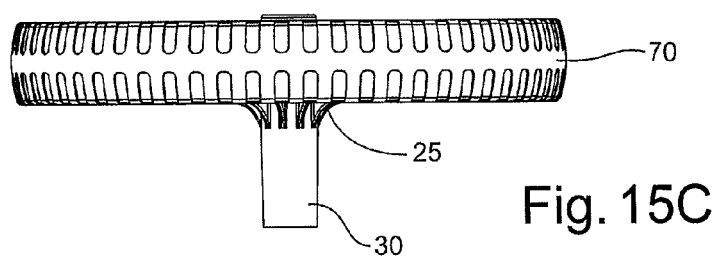
FIG. 15C is a side view of the tire.

Wheel 10, as used herein, refers to a device which includes an inner hub 20, an outer hub 40 and an over mold tread 70. Inner hub 20, as used herein, refers to a portion of a wheel 10 which includes a first side 22, a second side 24, a plurality of inner spokes 25, an inner circumferential member 26 and an axle shaft 30. In one embodiment of the present invention, the inner hub 20 includes a first side 22, a second side 24 which is generally parallel to and opposite of the first side 22, an axle shaft 30 emanating up from the second side 24 and a plurality of inner spokes 25 emanating up from the second side 24 and outward from the axle shaft 30 and engaging an inner circumferential member 26. In another embodiment of the present invention, the proximal end 32 of an inner spoke is engaged to the outer wall 37 of an axle shaft 30 and the distal end 34 of the inner spoke 25 is engaged to the inner surface 27 of an inner circumferential member 26. Looking to FIGS. 4 and 5 it is illustrated that the plurality of spokes 25 located between and engaged with the axle shaft outer wall 37 and the inner circumferential member 26 result in a plurality of cavities 29 which are clearly visible. Also included within the inner hub 20 are numerous features illustrated in FIGS. 1-6 such as the retaining hole plug 38 which aids in the retention of an axle within the axle shaft 30 in addition to inner wall 36 and the splines 35 located within the axle shaft (FIGS. 2 and 12). The pin extraction hole 39 is illustrated in FIGS. 1, 3 and 6 and is the site where a retaining pin is inserted to aid in the retention of an axle or removed to facilitate the axle's release. The length of the axle shaft 30 may be in the range of 1 to 12 centimeters, 2-10 centimeters, 3-8 centimeters or 4-6 centimeters.

The diameter and thickness of the wheel 10 may vary. In one embodiment of the present invention, the diameter of a wheel 10 is in the range of 12 to 45 centimeters. In another embodiment of the present invention, the diameter of a wheel is in the range of 18 to 40 centimeters. In still another embodiment, the diameter of a wheel is in the range of 22 to 36 centimeters. In yet another embodiment, the diameter of a wheel is in the range of 25 to 31 centimeters. In still another embodiment, the diameter of a wheel is 25.5 centimeters. In yet another embodiment, the diameter of a wheel is 30.5 centimeters. In still another embodiment, the diameter of a wheel is in the range of 10 to 12.5 centimeters. In yet another embodiment, the diameter of a wheel is the range of 12.5 to 15.25 centimeters. In still another embodiment, the diameter of a wheel is in the range of 15.25 to 17.75 centimeters. In yet another embodiment, the diameter of a wheel is the range of 17.75 to 20.25 centimeters. In still another embodiment, the diameter of a wheel is in the range of 20.25 to 25.4 centimeters. In yet another embodiment, the diameter of a wheel is the range of 25.4 to 30.5 centimeters. In still another embodiment, the diameter of a wheel is in the range of 30.5 to 35.25 centimeters. In yet another embodiment, the diameter of a wheel is the range of 35.25 to 40.75 centimeters. In still another embodiment, the thickness of a wheel is in the range of 2 to 12.75 centimeters. In yet another embodiment, the thickness of a wheel is in the range of 3 to 10 centimeters. In still another embodiment, the thickness of a wheel is 5.1 centimeters.

Outer hub 40, as used herein, refers to a portion of a wheel 10 which includes a first side 42, a second side 44, a plurality of outer spokes 45 and an over mold substrate 46. In general, the outer spokes 45 have a proximal end 52 and a distal end 54. In one embodiment of the present invention, the outer hub 40 includes a first side 42, a second side 44 which is generally parallel to and opposite of the first side 42 and a plurality of outer spokes 45 emanating from the inner circumferential member 26, the spokes 45 are engaged to the outer surface 28 or the inner circumferential member 26 at the proximal end 52 of the outer spokes 45 and are engaged to the inner surface 47 of the over mold substrate 46 at the distal end 54 of the outer spokes 45. In one embodiment of the present invention, the proximal end 52 of an outer spoke 45 is engaged to the outer surface 28 of an inner circumferential member 26 and the distal end 54 of the outer spoke 45 is engaged to the inner surface 47 of an over mold substrate 46. In another embodiment of the present invention, the inner hub 20 and the outer hub 40 are comprised of the same materials. In still another embodiment, the inner hub 20 and the outer hub 40 are comprised of different materials. In yet another embodiment, the inner hub 20 and the outer hub 40 are comprised of a material selected from the group including polyethylene, polypropylene, acrylonitrile butadiene styrene, high density polyethylene (HDPE), or a combination thereof. In still another embodiment, the inner hub 20 and outer hub 40 are comprised of HDPE. In yet another embodiment, the inner hub 20 and outer hub 40 are comprised solely of recycled HDPE.

Polyethylenes are well known in the art and include a thermoplastic white solid exhibiting high-temperature resistance, resistance to chemicals and to creep, possesses high impact strength and high tensile strength, exhibits high electrical resistivity and is resistant to stress cracks. Polyethylenes include those having the chemical formula $(C_2H_4)_nH_2$. Polypropylenes are well known in the art and include a thermoplastic polymer with a molecular weight of 40,000 or more. Polypropylenes include those having the chemical formula $(C_3H_6)_n$.

Figure 8:
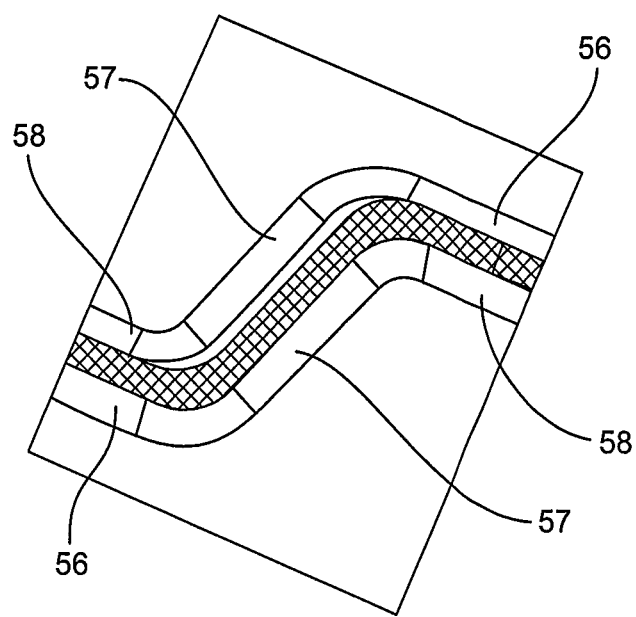
FIG. 8 is a cut through of 9-9 from FIG. 7.
Figure 9:
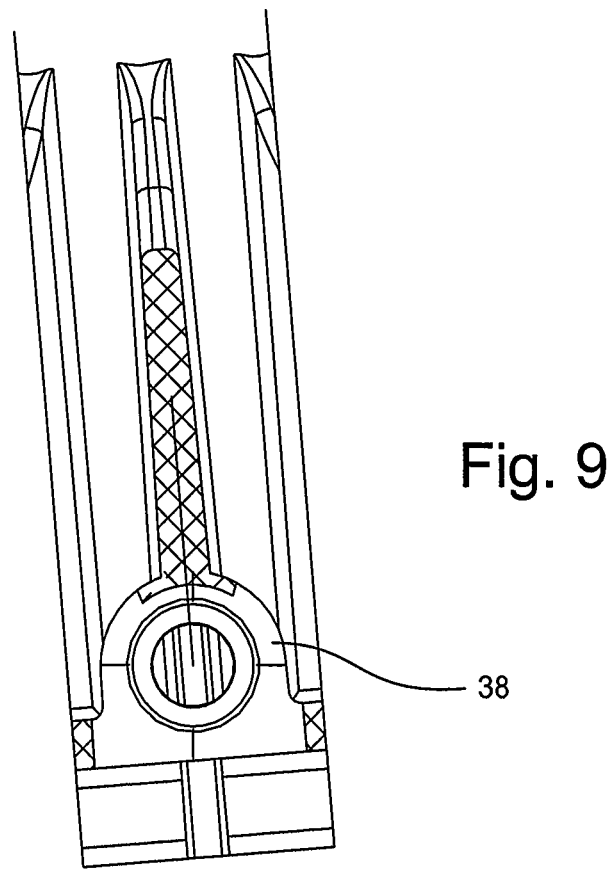
FIG. 9 is a cut through of 10-10 from FIG. 7.
Figure 10:
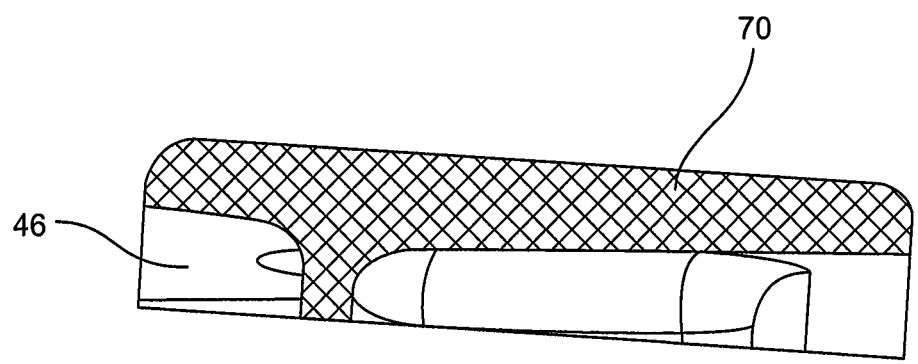
FIG. 10 is a cut through of 11-11 from FIG. 7.
Figure 11:
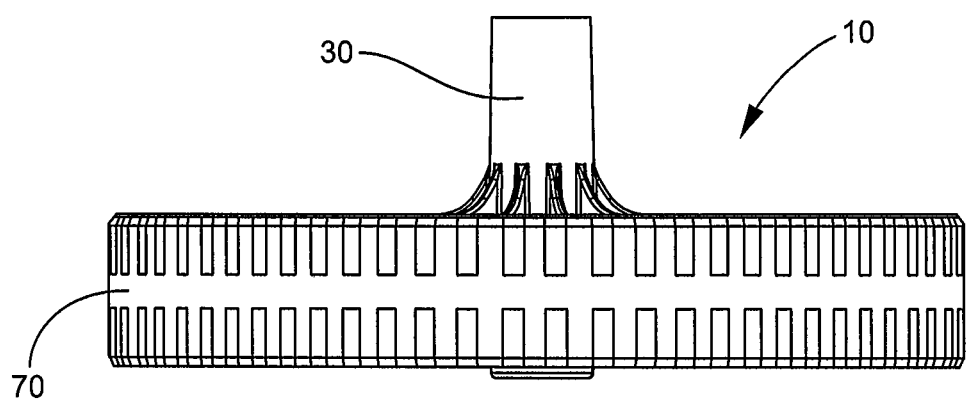
FIG. 11 is a side view of the wheel.

The outer spokes 45, located on the outer hub 40, bridge the gap between the inner circumferential member 26 and the over mold substrate 46. Looking to FIGS. 4-8 one can see that the outer spokes 45 may include numerous potential features including an upper surface 56 and a lower surface 58 which are engaged to one another by an angled surface 57 of which one embodiment is clearly is clearly illustrated in FIG. 8. In one embodiment of the present invention, the outer spokes 45 are generally narrower at their proximal end 52 where it engages the outer circumferential surface 28 of the inner hub 20 and gradually becomes broader as it traverses toward its distal end 54 where it engages the inner surface 47 of the over mold substrate 46. In another embodiment of the present invention, the outer spokes 45 are either substantially straight or curved as they traverse from their proximal ends 52 to their distal ends 54. In still another embodiment, the outer spokes include an upper surface 56, an angled surface 57 and a lower surface 58, the location of each surface is dependent on which side of a wheel 10 an individual is looking at (i.e. the upper surface 56 of an outer spoke 45 on the first side 42 of the outer hub 40 is parallel to and opposite of the lower surface 58 of the same outer spoke 45 on the second side 44).

Recycled material (i.e. recycled rubber, recycled polymer, as used herein, refers to the processing of materials which were previously used into new products. Recycling, as used herein, refers to a process of waste management wherein used materials are converted into new products to (1) prevent the waste of potentially useful materials, (2) reduce the consumption of fresh materials, (3) reduce energy usage, (4) reduce air pollution, (5) reduce water pollution, (6) reduce the need for "conventional" waste disposal (i.e. a landfill), and (7) lowering greenhouse gas production when compared to virgin production. Recycle may refer to the creation of a fresh supply of the same material being recycled. Recycling may also refer to the reuse of the original material in the production of a different material (i.e. cardboard from used office paper).

Over mold substrate 46, as used herein, refers to a portion of a wheel 10 having an inner surface 47 and outer surface 48, the outer surface 48 is generally parallel to and opposite of the inner surface 47. Over mold tread 70, as used herein, refers to the outermost layer of the wheel 10 of the current invention. In one embodiment of the present invention, an over mold tread 70 is chemically bonded to the outer surface 48 of an over mold substrate 46. In another embodiment, the over mold tread 70 is comprised of a mixture of a rubber, a recycled rubber, a polymer, a recycled polymer or a combination thereof. In yet another embodiment, the over mold tread 70 is comprised of a material which is different from that of the over mold substrate 46. In still another embodiment, the over mold tread 70 is not mechanically adjoined to the over mold substrate 46. In yet another embodiment, the over mold tread 70 is chemically bonded to the over mold substrate 46. In still another embodiment, the over mold tread 70 is both mechanically adjoined and chemically bonded to the over mold substrate 46. In yet another embodiment, the over mold tread 70 is comprised of a material or materials which are different that the materials which comprise the inner hub 20 and the outer hub 40. In still another embodiment, the over mold tread 70 is comprised of a material or materials which are the same as the materials which comprise the inner hub 20 and the outer hub 40.

In one embodiment of the present invention, the over mold tread 70 is comprised of a material selected from the group including a thermoplastic elastomer, a thermoplastic urethane, a natural rubber, a synthetic rubber, a polymer, a copolymer, a polyolefin, or a combination thereof; wherein at least one material is a recycled material. Thermoplastic elastomers (TPE), sometimes referred to as thermoplastic rubbers, are a class of copolymers or a physical mix of polymers (usually a plastic and a rubber) which consist of materials with both thermoplastic and elastomeric properties. While most elastomers are thermosets, thermoplastics are in contrast relatively easy to use in manufacturing, for example, by injection molding. Thermoplastic elastomers show advantages typical of both rubbery materials and plastic materials. The principal difference between thermoset elastomers and thermoplastic elastomers is the type of crosslinking bond in their structures. In fact, crosslinking is a critical structural factor which contributes to impart high elastic properties. The crosslink in thermoset polymers is a covalent bond created during the vulcanization process. Thermoplastic polyurethane (TPU) is any of a class of polyurethane plastics with many useful properties, including elasticity, transparency, and resistance to oil, grease and abrasion. Technically, they are thermoplastic elastomers consisting of linear segmented block copolymers composed of hard and soft segments. Thermoplastic polyolefins: polyethylene (PE), polypropylene (PP), polymethylpentene (PMP), polybutene-1 (PB-1); Polyolefin elastomers (POE): polyisobutylene (PIB), Ethylene propylene rubber (EPR), ethylene propylene diene Monomer (M-class) rubber (EPDM rubber). In one embodiment of the present invention, the over mold tread 70 is comprised of 40 to 60% HDPE and 40 to 60% of recycled rubber.

In one embodiment of the present invention, the inner hub 20 and the outer hub 40 are comprised of a high density polyethylene (HDPE). In one embodiment, the HDPE is a polyethylene used for injecting all or a portion of the inner hub 20 and the outer hub 40 or the inner hub 20 and the outer hub 40 and the over mold tread 70 which is selected from a source including recycled thermoplastic polyethylene from detergent, shampoo and other household product containers as well as newly produced forms of the above materials. The raw materials (i.e., recycled materials, newly produced materials, etc.) may be supplied to the injection molding machine in the form of pellets in a variety of colors. The pellets may range in diameter from less than 1 millimeter to 10 millimeters, from 1 to 8 millimeters, from 2 to 6 millimeters, from 3-5 millimeters, or any combination thereof. The raw materials may have a melt index in the range of 0.2-0.8/10 minutes, from 0.3-0.6/10 minutes, from 0.4-0.5/10 minutes, or any combination thereof. In one embodiment of the present invention, the raw materials may be HDPE from recycled trash carts and recycled containers and have a melt index of 5 with a density of 0.95. The characteristics are: Melt Index of 5/10 minutes; Density of 0.945-0.96 g/CC; Tensile Strength of 3200 psi; Elongation at break>400%; Flexural Modulus 150,000 psi; Low Temp Brittleness<–112° C. The raw materials may have a density in the range of 0.950-0.970 g/CC. The raw materials may possess a tensile strength according to ASTM D 638 (herein incorporated by reference in its entirely) which achieves an elongation at break of at least 215%. The raw materials may have an impact resistance of at least 5 ft-lb/in as measured by ASTM D 256 (herein incorporated by reference in its entirely). The raw materials have a flex modulus of 100,000 psi as measured by the Point Flexural Test (ASTM D 790, herein incorporated by reference in its entirely). The raw materials have a heat deflection ability of 65° C. as measured by the Heat Deflection Test (ASTM D-648-07, herein incorporated by reference in its entirely). In one embodiment of the present invention, the raw rubber materials possess a durometer of 76 shore A, a tensile strength of 720,000 psi, a flex modulus of 9500 and an elongation of at least 135%.

In one embodiment of the present invention, a wheel 10 is comprised of 65-70% plastic (as described above) and 30-35% rubber (as described above). In another embodiment of the present invention a wheel having a diameter of 25.5 centimeters is produced using 69% plastic (as described above) and 31% rubber (as described above). In still another embodiment, a wheel having a diameter of 30.5 centimeters is produced using 67% plastic (as described above) and 33% rubber (as described above).

Injection molding machines are known in the art. In one embodiment of the present invention, an injection molding machine 80 is made up of an injection unit 81 and a clamping unit 90. The injection unit 81 includes a drive, a hopper 82, an injection barrel 84, an injection cylinder 86 and a nozzle 88. The clamping unit 90 includes an injection mold 91 which is made up of a drive to operate the clamping bar/press 96, a moveable platen 97, a stationary platen 98 and two mold halves (i.e. male mold 92 and female mold 94) which together form the injection mold 91 which surrounds the injection mold cavity 95. Injection molding machines from the Toyo Machinery and Metal Company, LTD (523-1 Fukusato Futami-cho Akashi City Hyogo, 674-0091, Japan) have been shown to function adequately using the methods disclosed herein to produce the products disclosed herein. Specifically, the Toyo 500t molding injection machine and the Haitian 1000 Tons molding injection machine have been shown to function adequately using the methods disclosed herein to produce the products disclosed herein.

The injection molding process is a commonly used manufacturing process for the fabrication of plastic parts. A wide variety of products are manufactured using injection molding, which vary greatly in their size, complexity, and application. The injection molding process requires the use of an injection molding machine, raw plastic material (i.e. pellets), and a mold. The raw material is melted in the injection molding machine and then injected into the mold, where it cools and solidifies into the final part.

One embodiment of the present invention describes the numerous components which make up an injection molding machine 80:

1. The hopper 82—Raw materials enter the injection molding machine 80 as either plastic pellets or some other form of plastic granule. This raw material is stored into the hopper 82 until it is needed.

2. Injection Barrel 84—The hopper 82 feeds raw material into the injection barrel 84 by way of gravity or a drive system. The injection barrel 84 is heated by a heater 85 in order to begin melting the raw material on its way to be injected. The injection barrel may heat the raw materials to a temperature in the range of 200 to 250° C., in the range of 210 to 240° C., in the range of 220 to 230° C., or in the range of 220 to 225° C. Additional materials (i.e. colors, stabilizers, etc.) may be added to the raw material at this stage.

3. Injection cylinder 86—The melted material is driven through the injection barrel 84 and through the nozzle 88 by some mechanical means (i.e. a reciprocating screw 83 drives the plastic forward into the injection cylinder 86, or a hydraulic ram does the same).

4. The injection mold 91—The injection mold 91 is the component that contains an empty volume (the injection mold cavity 95) in the negative shape of the desired part. The injection mold cavity 95 is where the melted plastic material is injected to receive its permanent shape. Typically the injection mold 91 is cooled so that the plastic hardens evenly and quickly. The injection mold 91 is made up of two parts, the male injection mold 92 and the female injection mold 94, which separate to allow the part to be retrieved after the process is done.

5. Ejector Pin—Some components do not simply fall out of the injection mold 91 when completed so an additional ejector pin is added to knock the part out of the injection mold cavity 95.

Figure 16:
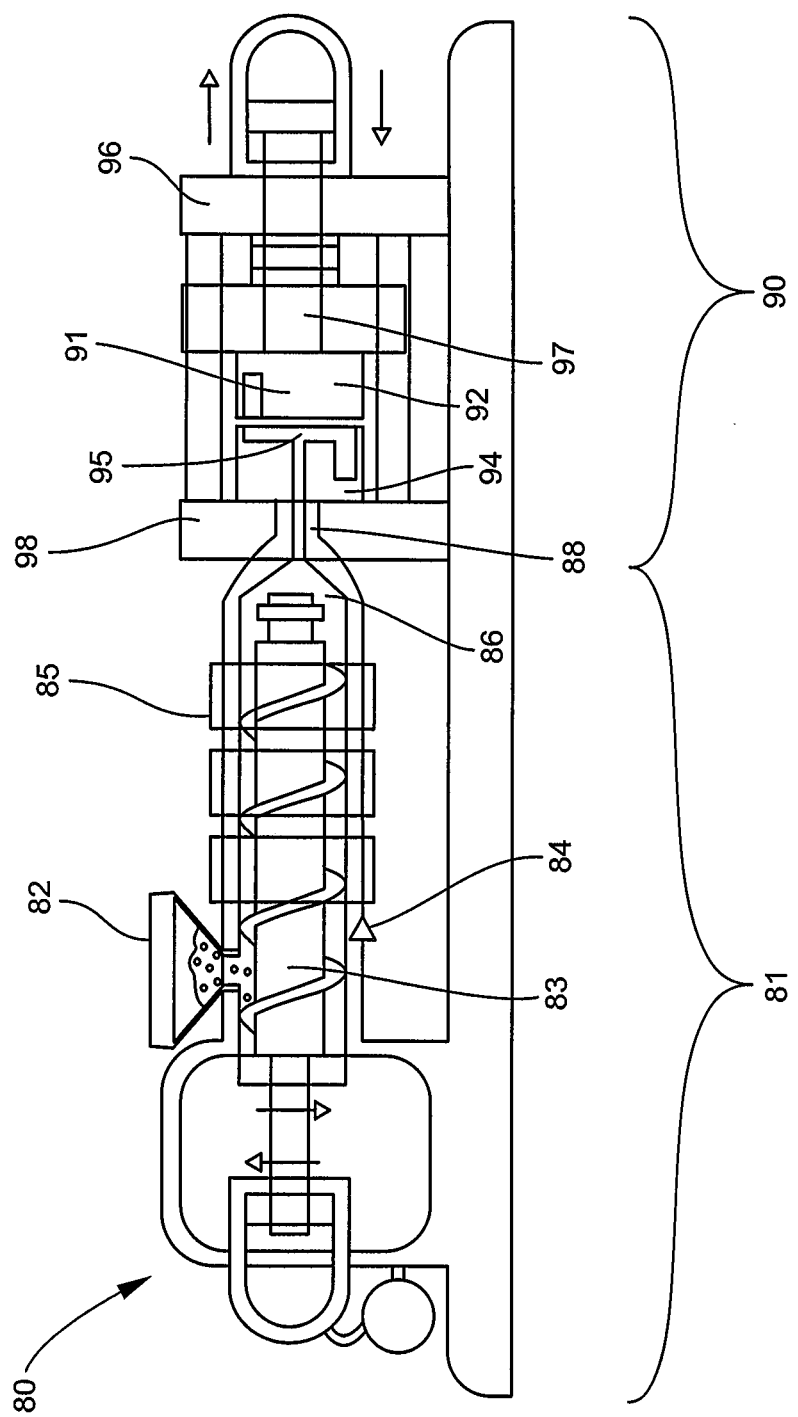
FIG. 16 is a profile view of an injection molding apparatus.

Looking to FIG. 16, one embodiment of an injection molding machine 80 is illustrated which includes an injection unit 81 which includes a hopper 82, a screw 83, an injection barrel 84, a heater 85, an injection cylinder 86 and a nozzle 88. The injection molding machine 80 also includes a clamping unit 90 which includes an injection mold 91 which is made up of a male injection mold 92 and a female injection mold 94 (which together for an injection mold cavity 95) and also includes a clamping bar 96 which aids in compressing the male and female injection molds together in conjunction with a movable platen 97 and a stationary platen 98.

In one embodiment of the present invention, the wheel as described herein is able to meet all of the requirements of ANSI Z245.30 and Z245.60 (Durability During Pulling (CURB TEST)) which is herein incorporated by reference in its entirety. The Z245.30 and Z245.60 tests determine whether a cart's wheels will withstand the repeated pulling forces experienced during normal 10-year useful life. The ANSI standard Z245.30 requires that after testing the handles, wheels, axles, their attachments to the container, and the container itself must remain functional.

The invention also discloses a process for manufacturing a wheel comprising the steps of:

(1) loading primary pellets into a primary hopper on a primary injection molding machine;
(2) conveying the primary pellets from the primary hopper to a primary injection barrel;
(3) heating the primary pellets within the primary injection barrel to form a primary melted material;
(4) conveying the primary melted material to a primary injection cylinder;
(5) injecting the melted material into a primary injection mold forming a plastic hub including: an inner hub including: a first side 22, a second side 24 being generally parallel to and opposite of the first side, an axle shaft 30 emanating up from the second side 24, a plurality of inner spokes 25 emanating up from the second side 24 and outward from the axle shaft 30 and engaging an inner circumferential member 26; an outer hub 40 engaged to the inner circumferential member 26, the outer hub 40 including a first side 42, a second side 44 being generally parallel to and opposite of the first side, a plurality of outer spokes 45 emanating from the inner circumferential member 26, the outer spokes 45 being engaged to the inner circumferential member 26 at a proximal end 52 of the spokes and engaged to an inner surface 47 of an over mold substrate 46 at a distal end 54 of the spokes 45, the over mold substrate 46 also having an outer surface 48 being generally parallel to and opposite of the inner surface;
(6) removing the plastic hub from the primary injection mold;
(7) inserting the plastic hub into a secondary injection mold which is operatively associated with a secondary injection molding machine;
(8) loading secondary pellets into a secondary hopper on the secondary injection molding machine;
(9) conveying the secondary pellets from the secondary hopper to a secondary injection barrel;
(10) heating the secondary pellets within the secondary injection barrel to form a secondary melted material;
(11) conveying the secondary melted material to a secondary injection cylinder; and
(12) injecting the secondary melted material into a secondary injection mold forming an over mold tread which is chemically bonded to the outer surface of the circumferential member, the over mold tread comprising a mixture of a rubber, a polymer and a recycled polymer.
(13) removing the completed wheel from the secondary injection mold.

In one embodiment of the above method, the inner hub 20 and the outer hub 40 are comprised of the same materials. In another embodiment of the above method, the inner hub 20 and the outer hub 40 are comprised of a material selected from the group including polyethylene, polypropylene, acrylonitrile butadiene styrene, high density polyethylene, or a combination thereof. In still another embodiment of the above method, the over mold tread 70 is comprised of a material selected from the group including a thermoplastic elastomer, a thermoplastic urethane, a natural rubber, a synthetic rubber, a polymer, a copolymer, a polyolefin, or a combination thereof, wherein at least one material is a recycled material. In yet another embodiment of the above method, the over mold tread 70 is a material which is different that the inner hub 20 and the outer hub 40. In still another embodiment of the above method, the wheel 10 is able to satisfy ASTM 24530. In yet another embodiment of the above method, the outer spokes 45 are generally narrower at their proximal ends 52 where it engages the outer surface 28 of an inner circumferential member 26 of the inner hub and gradually becoming broader as it traverses toward its distal end where it engages the inner surface 47 of the over mold substrate 46. In still another embodiment of the above method, the outer spokes 45 are either substantially straight or curved as they traverse from their proximal ends 52 to their distal ends 54.

In another embodiment of the present invention, the above mentioned process or processes may be carried out using a co-injection machine. Using such a machine would include a process for manufacturing a wheel comprising the steps of:

(1) loading primary pellets into a primary hopper on a primary injection molding machine;
(2) conveying the primary pellets from the primary hopper to a primary injection barrel;
(3) heating the primary pellets within the primary injection barrel to form a primary melted material;
(4) conveying the primary melted material to a primary injection cylinder;
(5) injecting the melted material into a primary injection mold forming a plastic hub including: an inner hub including: a first side 22, a second side 24 being generally parallel to and opposite of the first side, an axle shaft 30 emanating up from the second side 24, a plurality of inner spokes 25 emanating up from the second side 24 and outward from the axle shaft 30 and engaging an inner circumferential member 26; an outer hub 40 engaged to the inner circumferential member 26, the outer hub 40 including a first side 42, a second side 44 being generally parallel to and opposite of the first side, a plurality of outer spokes 45 emanating from the inner circumferential member 26, the outer spokes 45 being engaged to the inner circumferential member 26 at a proximal end 52 of the spokes and engaged to an inner surface 47 of an over mold substrate 46 at a distal end 54 of the spokes 45, the over mold substrate 46 also having an outer surface 48 being generally parallel to and opposite of the inner surface;
(6) rotating the plastic hub within the primary injection mold;
(7) loading secondary pellets into a secondary hopper on the primary injection molding machine;

(8) conveying the secondary pellets from the secondary hopper to a secondary injection barrel;
(9) heating the secondary pellets within the secondary injection barrel to form a secondary melted material;
(10) conveying the secondary melted material to a secondary injection cylinder;
(11) injecting the secondary melted material into the primary injection mold forming an over mold tread which is chemically bonded to the outer surface of the circumferential member, the over mold tread comprising a mixture of a rubber, a polymer and a recycled polymer.
(12) removing the completed wheel from the primary injection mold and the injection molding machine.

TABLE 1

INJECTION MOLDING PROCESS DATA
12" Over Molding injection sheet

| Part Name | 12" Wheel | Part No. | 12" Over Mold | Mold No. | 11246 | No. of Caw | 3 |
|---|---|---|---|---|---|---|---|
| Machine Type | Haitian | Machine Size | 1000T | Material | HDPE | Color | black |
| Grow Wt(g) | 1875 | Runner Wt(g) | | Mold Size(mm) | 1200 × 860 × 817 | Mold Type | 2 Plate |
| Time(sec) | Cycle Time | 58 | | Speed(mm/s) | Recovery Speed | | |
| | Filling Time | 10 | | | 段 Injection Velocity1 | | 65 |
| | Transfer Time | | | | Injection Velocity2 | | 25 |
| | Pack Time | | | | Injection Velocity3 | | 15 |
| | Hold Time | 20 | | | Injection Velocity4 | | |
| | Cooling Time | 15 | | | Screw Speed | | |
| Pressure(bar) | (Injection Pressure) | 1st Stage | 105 | | Ejection Speed | | |
| | | 2nd Stage | 70 | | Pack/Hold Flow | | |
| | | 3rd Stage | 40 | Temp(° C.) | Nozzle Temp ° C. | | 230 |
| | | 4th Stage | | | Zone 1 Temp ° C. | | 230 |
| | Transfer Pressure | | | | Zone 2 Temp ° C. | | 220 |
| | Pack Pressure | | | | Zone 3 Temp ° C. | | 210 |
| | Hold Pressure | | 40 | | Zone 4 Temp ° C. | | 310 |
| | Recovery Pressure | | 120 | | Hot Runner Temp | | 230 |
| | Blak Pressure | | 8 | | Cavity Temp | | 10 |
| Position(mm) | Shot Size | | | | Core Temp | | 10 |
| | Post Suck Back | | | | Slide Temp | | 10 |
| | (Position1)mm | | 210 | | Dryer Temp and Time | | NA |
| | (Position2)mm | | 260 | Cooling System | Front Mold | Normal Mold | |
| | (Position3)mm | | 300 | | | Hot Water | |
| | (Position4)mm | | | | | Cool Water | 8 |
| | (Cushion Inj. Bad)mm | | | | Rear Mold | Normal Mold | |
| | Transfer Position mm | | | | | Hot Water | |
| | Min. Position mm | | | | | Cool Water | 8 |
| Mold | Clamp Pressure | | 140 | | Slide | Normal Mold | |
| | Opening Position | | 55 | | | Hot Water | |
| | KO Strock | | 105 | | | Cool Water | 8 |
| | Count of Ejection | | 1 | Ejection | Automatic | | V |
| | Core Pull | | | | Scmiumatic | | |
| | Sequence | | | | Handwork | | |

TABLE 2

INJECTION MOLDING PROCESS DATA
12" All-Plastic Injection Sheet

| Part Name | 12" Wheel | Part No. | Roll-Tec 12 Inch AP Wheel | Mold No. | 11246 | No. of Caw | 3 |
|---|---|---|---|---|---|---|---|
| Machine Type | Haitian | Machine Size | 1000T | Material | HDPE | Color | black |
| Grow Wt(g) | 1875 | Runner Wt(g) | | Mold Size(mm) | 1200 × 860 × 817 | Mold Type | 2 Plate |
| Time(sec) | Cycle Time | 95 | | Speed(mm/s) | Recovery Speed | | |
| | Filling Time | 9 | | | 段 Injection Velocity1 | | 80 |
| | Transfer Time | | | | Injection Velocity2 | | 60 |
| | Pack Time | | | | Injection Velocity3 | | 15 |

TABLE 2-continued

INJECTION MOLDING PROCESS DATA
12" All-Plastic Injection Sheet

| | | | | | | | |
|---|---|---|---|---|---|---|---|
| | Hold Time | 12 | | | Injection Velocity4 | | |
| | Cooling Time | 45 | | | Screw Speed | | |
| Pressure(bar) | (Injection Pressure) | 1st Stage | 110 | | Ejection Speed | | |
| | | 2nd Stage | 98 | | Pack/Hold Flow | | |
| | | 3rd Stage | 50 | Temp(° C.) | Nozzle Temp ° C. | | 250 |
| | | 4th Stage | | | Zone 1 Temp ° C. | | 250 |
| | Transfer Pressure | | | | Zone 2 Temp ° C. | | 250 |
| | Pack Pressure | | | | Zone 3 Temp ° C. | | 250 |
| | Hold Pressure | | 80 | | Zone 4 Temp ° C. | | 250 |
| | Recovery Pressure | | 120 | | Hot Runner Temp | | 250 |
| | Blak Pressure | | 8 | | Cavity Temp | | |
| Position(mm) | Shot Size | | | | Core Temp | | |
| | Post Suck Back | | | | Slide Temp | | |
| | (Position1)mm | | 80 | | Dryer Temp and Time | | |
| | (Position2)mm | | 60 | Cooling System | Front Mold | Normal Mold | |
| | (Position3)mm | | | | | Hot Water | |
| | (Position4)mm | | | | | Cool Water | V |
| | (Cushion Inj. Bad)mm | | | | Rear Mold | Normal Mold | |
| | Transfer Position mm | | | | | Hot Water | |
| | Min. Position mm | | | | | Cool Water | V |
| Mold | Clamp Pressure | | 140 | | Slide | Normal Mold | |
| | Opening Position | | 55 | | | Hot Water | |
| | KO Strock | | | | | Cool Water | |
| | Count of Ejection | | 1 | Ejection | Automatic | | V |
| | Core Pull Sequence | | | | Scmiumatic Handwork | | |

TABLE 3

INJECTION MOLDING PROCESS DATA
10" Over Molding injection sheet

| | | | | | | | | |
|---|---|---|---|---|---|---|---|---|
| Part Name | 10 inch | Part No. | 10" OverMold | Mold No. | 11246 | No. of Caw | 1 × 3 | |
| Machine Type | haitian | Machine Size | 1000T | Material | HDPE | Color | Black | |
| Grow Wt(g) | 510 | Runner Wt(g) | | Mold Size(mm) | | Mold Type | | |
| Time(sec) | Cycle Time | 56 | | Speed(mm/s) | Recovery Speed | | | |
| | Filling Time | 6 | | | 段 Injection Velocity1 | | 68 | |
| | Transfer Time | | | | Injection Velocity2 | | 15 | |
| | Pack Time | | | | Injection Velocity3 | | | |
| | Hold Time | 5 | | | Injection Velocity4 | | | |
| | Cooling Time | 25 | | | Screw Speed | | | |
| Pressure(bar) | (Injection Pressure) | 1st Stage | 90 | | Ejection Speed | | | |
| | | 2nd Stage | 65 | | Pack/Hold Flow | | | |
| | | 3rd Stage | | Temp(° C.) | Nozzle Temp ° C. | | 230 | |
| | | 4th Stage | | | Zone 1 Temp ° C. | | 230 | |
| | Transfer Pressure | | | | Zone 2 Temp ° C. | | 230 | |
| | Pack Pressure | | | | Zone 3 Temp ° C. | | 220 | |
| | Hold Pressure | | 65 | | Zone 4 Temp ° C. | | 210 | |
| | Recovery Pressure | | | | Hot Runner Temp | | 230 | |
| | Blak Pressure | | | | Cavity Temp | | | |
| Position(mm) | Shot Size | | | | Core Temp | | | |
| | Post Suck Back | | | | Slide Temp | | | |
| | (Position1)mm | | 100 | | Dryer Temp and Time | | | |
| | (Position2)mm | | 65 | Cooling System | Front Mold | Normal Mold | | |
| | (Position3)mm | | | | | Hot Water | | |
| | (Position4)mm | | | | | Cool Water | ✓ | |
| | (Cushion Inj. Bad)mm | | | | Rear Mold | Normal Mold | | |

TABLE 3-continued

INJECTION MOLDING PROCESS DATA

10" Over Molding injection sheet

| | | | | | | |
|---|---|---|---|---|---|---|
| Mold | Transfer Position mm | | | | Hot Water | |
| | Min. Position mm | | | | Cool Water | ✓ |
| | Clamp Pressure | 140 | | Slide | Normal Mold | |
| | Opening Position | 30 | | | Hot Water | |
| | KO Strock | | | | Cool Water | |
| | Count of Ejection | | | Ejection | Automatic | |
| | Core Pull | | | | Scmiumatic | |
| | Sequence | | | | Handwork | |

TABLE 4

INJECTION MOLDING PROCESS DATA

| | | | | | | | | |
|---|---|---|---|---|---|---|---|---|
| Part Name | 10 inch | Part No. | Roll-Tech 10 Inch AP Wheel | Mold No. | 11246 | No. of Caw | 1 × 3 | |
| Machine Type | haitian | Machine Size | 1000T | Material | HDPE | Color | Black | |
| Grow Wt(g) | 510 | Runner Wt(g) | | Mold Size(mm) | | Mold Type | | |
| Time(sec) | Cycle Time | 90 | | Speed(mm/s) | Recovery Speed | | | |
| | Filling Time | 8 | | | 段 Injection Velocity1 | | 80 | |
| | Transfer Time | | | | Injection Velocity2 | | 45 | |
| | Pack Time | | | | Injection Velocity3 | | 20 | |
| | Hold Time | 10 | | | Injection Velocity4 | | | |
| | Cooling Time | 40 | | | Screw Speed | | | |
| Pressure(bar) | (Injection Pressure) | 1st Stage | 98 | | Ejection Speed | | | |
| | | 2nd Stage | 70 | | Pack/Hold Flow | | | |
| | | 3rd Stage | 45 | Temp(° C.) | Nozzle Temp ° C. | | 245 | |
| | | 4th Stage | | | Zone 1 Temp ° C. | | 245 | |
| | Transfer Pressure | | | | Zone 2 Temp ° C. | | 245 | |
| | Pack Pressure | | | | Zone 3 Temp ° C. | | 245 | |
| | Hold Pressure | 60 | | | Zone 4 Temp ° C. | | 240 | |
| | Recovery Pressure | 130 | | | Hot Runner Temp | | 230 | |
| | Blak Pressure | 8 | | | Cavity Temp | | | |
| Position(mm) | Shot Size | | | | Core Temp | | | |
| | Post Suck Back | | | | Slide Temp | | | |
| | (Position1)mm | 160 | | | Dryer Temp and Time | | | |
| | (Position2)mm | 130 | | Cooling System | Front Mold | Normal Mold | | |
| | (Position3)mm | | | | | Hot Water | | |
| | (Position4)mm | | | | | Cool Water | V | |
| | (Cushion Inj. Bad)mm | | | | Rear Mold | Normal Mold | | |
| | Transfer Position mm | | | | | Hot Water | | |
| | Min. Position mm | | | | | Cool Water | V | |
| Mold | Clamp Pressure | 140 | | | Slide | Normal Mold | | |
| | Opening Position | 55 | | | | Hot Water | | |
| | KO Strock | | | | | Cool Water | | |
| | Count of Ejection | 1 | | Ejection | Automatic | | V | |
| | Core Pull | | | | Scmiumatic | | | |
| | Sequence | | | | Handwork | | | |

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein.

What is claimed is:

1. A method for manufacturing a wheel comprising the steps of:
    loading primary pellets into a primary hopper on a primary injection molding machine;
    conveying said primary pellets from said primary hopper to a primary injection barrel;
    heating said primary pellets within said primary injection barrel to form a primary melted material;
    conveying said primary melted material to a primary injection cylinder;
    injecting said melted material into a primary injection mold forming a plastic hub including:
        an inner hub including:
            a first side;
            a second side being generally parallel to and opposite of said first side;
            an axle shaft emanating up from said second side; and
            a plurality of inner spokes emanating up from said second side and outward from said axle shaft and engaging an inner circumferential member;
        an outer hub engaged to the inner circumferential member, said outer hub including:
            a first side;
            a second side being generally parallel to and opposite of said first side;
            a plurality of spokes emanating from the inner circumferential member
                said spokes being engaged to said inner circumferential member at a proximal end of said spokes; and
                said spokes being engaged to an inner surface of an over mold substrate at a distal end of said spokes;
                said over mold substrate also having an outer surface being generally parallel to and opposite of said inner surface;
    removing said plastic hub from said primary injection mold;
    inserting said plastic hub into a secondary injection mold which is operatively associated with a secondary injection molding machine;
    loading secondary pellets into a secondary hopper on said secondary injection molding machine;
    conveying said secondary pellets from said secondary hopper to a secondary injection barrel;
    heating said secondary pellets within said secondary injection barrel to form a secondary melted material;
    conveying said secondary melted material to a secondary injection cylinder; and
    injecting said secondary melted material into a secondary injection mold forming an over mold tread which is chemically bonded to the outer surface of said circumferential member, said over mold tread comprising a mixture of a rubber, a polymer and a recycled polymer;
    wherein said outer spokes being generally narrower at their proximal end where they engage said inner circumferential member of said inner hub and gradually becoming broader as they traverse toward their distal end where they engage said inner surface of said over mold substrate; said spokes being either substantially straight or curved as they traverse from their proximal ends to their distal ends; and said spokes including an upper surface and a lower surface which are engaged to one another by an angled surface.

2. The method of claim 1 wherein the inner hub and the outer hub are comprised of the same materials.

3. The method of claim 1 wherein the inner hub and the outer hub are comprised of a material selected from the group including polyethylene, polypropylene, acrylonitrile butadiene styrene, high density polyethylene, or a combination thereof.

4. The method of claim 1 wherein the over mold tread is comprised of a material selected from the group including a thermoplastic elastomer, a thermoplastic urethane, a natural rubber, a synthetic rubber, a polymer, a copolymer, a polyolefin, or a combination thereof;
    wherein at least one material is a recycled material.

5. The method of claim 1 wherein the over mold tread is a material which is different that the inner hub and the outer hub.

6. The method of claim 1 wherein said wheel being able to pass ASTM 24530.

* * * * *